Patented Dec. 16, 1930

1,785,139

UNITED STATES PATENT OFFICE

HANSON H. MONROE, OF PAINESVILLE, OHIO, ASSIGNOR, BY MESNE ASSIGNMENTS, TO THE GRASSELLI CHEMICAL COMPANY, OF CLEVELAND, OHIO, A CORPORATION OF DELAWARE

PROCESS OF PRODUCING METALLIC CADMIUM FROM CADMIUM-CONTAINING MATERIAL

No Drawing.   Application filed May 18, 1928.   Serial No. 278,912.

This invention relates to a process whereby metallic cadmium is recovered in a high grade of purity from material containing metallic, chemically combined cadmium, or both, associated with other substances, and the process consists substantially in submitting such material to a caustic fusion under reducing conditions.

Materials of this kind are obtained in various metallurgical processes for the treatment of zinc and cadmium ores, and the process of the present invention allows of an economical and efficient working up of same.

Flue dusts of high cadmium content as produced in smelting, refining, or distilling zinc and cadmium bearing materials, are one type of industrial by-products which are well suited for the recovery of cadmium therefrom by my novel process. They are usually highly oxidized and contain, besides metallic cadmium and cadmium oxide, zinc, arsenic, lead, and other metals.

Cadmium sponge is another material from which it has been difficult to recover directly metallic cadmium in reasonably pure form. It is produced by suspending zinc slabs in a solution of crude zinc salts containing cadmium. The precipitated cadmium sponge is usually heavily contaminated with other metals, and contains, in addition, substantial amounts of zinc originating partly at least from the suspended zinc slabs which disintegrate during their dissolution.

Such cadmium sponge, when submitted to my novel reducing caustic fusion, will also yield metallic cadmium containing only small amounts of impurities.

Other similar zinc and cadmium containing materials can be similarly treated by my process with recovery of metallic cadmium.

My novel process comprises mixing the usually powdered cadmium and zinc bearing material with a ground caustic alkali and a ground carbonaceous fuel material, and heating this mixture slowly to a temperature around 400 to 500° C. The cadmium separates in molten form whereas the impurities dissolve in the molten caustic. The cadmium can be separated directly as such from the slag. It is also possible to leach the solidified melt with water, and in this manner separate the cadmium metal from the other impurities which will be found associated with the caustic alkali. For economical reasons I prefer to use caustic soda as the alkali.

I further found that the addition of a borate to fusions high in zinc content will materially assist in the separation of this zinc from the cadmium.

The amount of caustic soda used is not very critical but it is usually preferable to use at least five molecular proportions of NaOH figured on the zinc content of the material.

As the reducing agent I prefer to use a carbonaceous material of low ash content, as, for instance, petroleum coke. The amount added should be sufficient to completely reduce such cadmium oxide as may be present in the material. The action of the carbonaceous agent does not seem to be limited to the reduction of the oxides present, but has other beneficial effects inasmuch as I found the recovered cadmium to be of higher purity than can be obtained by a mere caustic fusion and with a practically quantitative yield.

The following examples are given to illustrate my novel process; the parts given therein are by weight, and it is understood that my invention is not limited to the particular materials, nor to the specific reacting conditions, mentioned in these examples.

(1) My novel process was applied to a roasted cadmium residue preparing as a yellow powder and containing:

|  | Per cent |
|---|---|
| Cadmium | 45.72 |
| Zinc | 16.00 |
| Arsenic | 21.26 |
| Iron | .42 |
| Lead | .88 |
| Total sulfur | 1.85 |
| Copper | Traces |

One part of this residue was mixed with 2 parts ground caustic soda and 1 part ground coke, and slowly heated to about 420° C. Metallic cadmium collected at the bottom of the crucible and was drawn off. A practically quantitative yield of a cadmium of over 98% purity was obtained.

(2) In this example an unroasted, black cadmium residue in powder form, was used. It contained:

| | Per cent |
|---|---|
| Cadmium | 47.01 |
| Zinc | 13.05 |
| Arsenic | 23.36 |
| Iron | .82 |
| Lead | .82 |
| Total sulfur | 1.78 |
| Copper | Traces |

This was submitted to the same fusion as in Example 1. Again a practically quantitative yield of metallic cadmium of a purity above 98% was obtained.

(3) The cadmium sponge used in this example contained:

| | Per cent |
|---|---|
| Cadmium | 65.3 |
| Zinc | 8.5 |
| Lead | .56 |

Twenty-five parts of the sponge were dried and then mixed with 5 parts finely ground coke and 30 parts flake caustic soda. This mass was heated slowly in a cast-iron crucible for 30 minutes at a temperature which kept the mass plastic, and was agitated frequently. It was then heated for about 15 minutes to a temperature which gave a fluid slag, and frequently agitated. The reduction was rapidly completed at this temperature. 97.2% of the total cadmium content of the sponge was recovered as metal, which contained:

| | Per cent |
|---|---|
| Cadmium | 96.6 |
| Zinc | 1.15 |
| Lead | .5 |

(4) Twenty-five parts of the same cadmium sponge as used in Example 3 were mixed with 5 parts 200 mesh petroleum coke and 30 parts of a mixed fluxing agent consisting of 90% caustic soda and 10% borax. The mixture was slowly heated to about 450° to 500° C., at which temperature the slag became sufficiently fluid. The metal was drawn off and an excellent recovery of cadmium was obtained which analyzed:

| | Per cent |
|---|---|
| Cadmium | 99.09 |
| Lead | .92 |
| Zinc | .02 |

The addition of borax in this example materially improved the separation of the zinc.

(5) This fusion was made similar to that of Example 4, using a mixed caustic soda and borax flux, with the exception of adding more caustic soda toward the end so as to improve the fluidity of the slag. The recovered metal analyzed:

| | Per cent |
|---|---|
| Cadmium | 98.86 |
| Lead | .95 |
| Zinc | .05 |

(6) Another, purer, cadmium sponge was used in this example. It contained:

| | Per cent |
|---|---|
| Cadmium | 51.60 |
| Lead | .05 |
| Zinc | 1.02 |

This was mixed with 1/5 part ground coke and 2/3 part caustic soda; heated until the slag became plastic and kept at this temperature for about 1/2 hour; 1/3 part of caustic soda was then added and heated until the slag became well fluid; separation was then effected, and a high yield of metallic cadmium was recovered which analyzed:

| | Per cent |
|---|---|
| Cadmium | 99.4 |
| Lead | .06 |
| Zinc | Traces |

I claim:
1. The process of recovering metallic cadmium from zinc and cadmium bearing material, which comprises submitting said material to the action of a molten caustic alkali in the presence of a carbonaceous reducing agent.

2. The process of recovering metallic cadmium from zinc and cadmium bearing material, which comprises mixing said material with a caustic alkali and a ground carbonaceous material, heating until a liquid melt is obtained, and separating the metal from the slag.

3. The process of recovering metallic cadmium from zinc and cadmium bearing material, which comprises mixing said material with caustic soda and a powdered carbonaceous fuel, heating to a temperature above 400° C., and separating the metal from the slag.

4. The process of recovering metallic cadmium from a cadmium containing material obtained in metallurgical processes for the smelting, refining, or distilling of zinc and cadmium, which comprises mixing said material with a caustic alkali and a powerful carbonaceous fuel, heating to effect fusion, and separating the metal from the slag.

5. The process of recovering metallic cadmium from a cadmium bearing material obtained in metallurgical processes for the treatment of cadmium and zinc ores, which comprises submitting said material to the action of a molten caustic alkali in the presence of a carbonaceous reducing agent.

6. The process of recovering metallic cadmium from a cadmium containing material obtained in metallurgical processes for the smelting, refining, or distilling of zinc and cadmium, which comprises mixing said material with caustic soda and powdered petroleum coke and heating to a temperature between 400 and 500° C.

7. The process of recovering metallic cadmium from a cadmium containing material obtained in metallurgical processes for the smelting, refining, or distilling of zinc and cadmium, which comprises fusing said material with a flux comprising caustic alkali and an alkali metal borate, and a powdered carbonaceous fuel.

8. The process of recovering metallic cadmium from a cadmium containing material obtained in metallurgical processes for the smelting, refining, or distilling of zinc and cadmium, which comprises mixing said material with caustic soda, borax and powdered coke, heating to about 400 to 500° C., and separating the metallic cadmium from the slag.

9. The process of recovering metallic cadmium from cadmium sponge, which comprises fusing the sponge with caustic soda and powdered carbonaceous fuel, and separating the metallic cadmium from the slag.

In testimony whereof, I affix my signature.

HANSON H. MONROE.